(12) United States Patent
Chen et al.

(10) Patent No.: US 7,036,269 B1
(45) Date of Patent: May 2, 2006

(54) MULTIPURPOSE MOSQUITO TRAP LAMP

(76) Inventors: Chang-Hao Chen, 4/F., No. 2, Hsinpu 7th St., Hsinpu Tsun, Taoyuan City (TW); Wu-Chun Hsu, No. 228, Chungcheng Rd., Chungho Li, Taoyuan City (TW)

( * ) Notice: Subject to any disclaimer, the term of this patent is extended or adjusted under 35 U.S.C. 154(b) by 0 days.

(21) Appl. No.: 10/963,526

(22) Filed: Oct. 14, 2004

(51) Int. Cl.
*A01M 1/08* (2006.01)

(52) U.S. Cl. .......................... 43/139; 43/113

(58) Field of Classification Search ................ 43/113, 43/139
See application file for complete search history.

(56) References Cited

U.S. PATENT DOCUMENTS

| | | | | | |
|---|---|---|---|---|---|
| 783,752 | A * | 2/1905 | Marston | | 43/139 |
| 959,155 | A * | 5/1910 | Nault | | 43/139 |
| 1,478,424 | A * | 12/1923 | Cross | | 43/139 |
| 1,484,369 | A * | 2/1924 | Andreucci | | 43/139 |
| 1,497,540 | A * | 6/1924 | Bowen | | 43/139 |
| 1,517,131 | A * | 11/1924 | Thompson | | 43/139 |
| 1,583,975 | A * | 5/1926 | Hunt | | 43/139 |
| 1,671,404 | A * | 5/1928 | Cherry | | 43/139 |
| 1,693,368 | A * | 11/1928 | Cherry | | 43/113 |
| 1,807,550 | A * | 5/1931 | Rector | | 43/139 |
| 2,384,930 | A * | 9/1945 | Kendrick | | 43/113 |
| 2,739,411 | A * | 3/1956 | Chapman et al. | | 43/139 |
| 2,778,150 | A * | 1/1957 | Pohlman | | 43/139 |
| 2,780,026 | A * | 2/1957 | Dail et al. | | 43/139 |
| 2,806,321 | A * | 9/1957 | Blackman | | 43/139 |
| 2,893,161 | A * | 7/1959 | Reid | | 43/139 |
| 2,931,127 | A * | 4/1960 | Mayo | | 43/139 |
| 3,020,671 | A * | 2/1962 | Potter | | 43/139 |
| 3,041,773 | A * | 7/1962 | Gagliano | | 43/139 |
| 3,058,257 | A * | 10/1962 | Brophy et al. | | 43/139 |
| 3,120,075 | A * | 2/1964 | Barnhart, Sr. | | 43/139 |
| 3,123,933 | A * | 3/1964 | Roche | | 43/139 |
| 3,152,420 | A * | 10/1964 | Pawl | | 43/139 |
| 3,196,577 | A * | 7/1965 | Plunkett | | 43/139 |
| 3,796,001 | A * | 3/1974 | Jackson | | 43/113 |
| 3,987,578 | A * | 10/1976 | Rueff | | 43/139 |
| 4,141,173 | A * | 2/1979 | Weimert et al. | | 43/113 |
| 4,282,673 | A * | 8/1981 | Focks et al. | | 43/113 |
| 4,919,370 | A * | 4/1990 | Martin et al. | | 248/56 |
| 5,305,495 | A * | 4/1994 | Nelsen et al. | | 15/414 |
| 5,329,725 | A * | 7/1994 | Bible | | 43/113 |
| 5,647,164 | A * | 7/1997 | Yates | | 43/139 |
| 6,718,685 | B1 * | 4/2004 | Bossler | | 43/107 |
| 6,817,139 | B1 * | 11/2004 | Powell et al. | | 43/113 |
| 6,871,445 | B1 * | 3/2005 | Bertani | | 43/139 |
| 2004/0148848 | A1 * | 8/2004 | Bertani | | 43/139 |
| 2004/0181997 | A1 * | 9/2004 | Lee et al. | | 43/139 |

* cited by examiner

*Primary Examiner*—Kurt Rowan
(74) *Attorney, Agent, or Firm*—Rosenberg, Klein & Lee

(57) ABSTRACT

A multipurpose mosquito trap lamp base includes a base that admits light, a holder frame mounted in the base and holds an induced-draft fan at the front side and an ultraviolet lamp at the rear side, a hollow shell coupled to the rear side of the base for trapping mosquitoes, a filter cap capped on the rear side of the hollow shell for removing dust from air passing through the hollow shell, and an ozone generator mounted inside the base for generating ozone to sterilize air passing through the base and the hollow shell and the filter cap.

4 Claims, 3 Drawing Sheets

MULTIPURPOSE MOSQUITO TRAP LAMP

BACKGROUND OF THE INVENTION

1. Field of the Invention

The present invention relates to a mosquito trap lamp for trapping mosquitoes and other insects and more particularly, to a multipurpose mosquito trap lamp, which catches mosquitoes and other small insects and simultaneously clean the air.

2. Description of the Related Art

Conventional mosquito trap lamps commonly use an ultraviolet lamp to give off ultraviolet light to attract mosquitoes, a guard-protected high-voltage electric netting to kill mosquitoes by a high voltage. These conventional mosquito trap lamps are still not satisfactory in function because of the following drawbacks:

1. The ultraviolet lamp gives off ultraviolet light to attract mosquitoes in a still status, and mosquitoes can be killed only when they touched the high-voltage electric netting.
2. People may touch the high-voltage electric netting accidentally. It is dangerous under a wet environment.
3. Conventional mosquito trap lamps are specifically designed to trap mosquitoes without providing any added functions.

SUMMARY OF THE INVENTION

The present invention has been accomplished under the circumstances in view. It is the main object of the present invention to provide a multipurpose mosquito trap lamp, which traps mosquitoes effectively. It is another object of the present invention to provide a multipurpose mosquito trap lamp, which induces currents of air and cleans the air. To achieve these and other objects of the present invention, the multipurpose mosquito trap lamp comprises a base that admits light, a holder frame mounted in the base and holds an induced-draft fan at the front side and an ultraviolet lamp at the rear side, a hollow shell coupled to the rear side of the base for trapping mosquitoes, a filter cap capped on the rear side of the hollow shell for removing dust from air passing through the hollow shell, and an ozone generator mounted inside the base for generating ozone to sterilize air passing through the base and the hollow shell and the filter cap.

DETAILED DESCRIPTION OF THE PREFERRED EMBODIMENT

Figure 1:
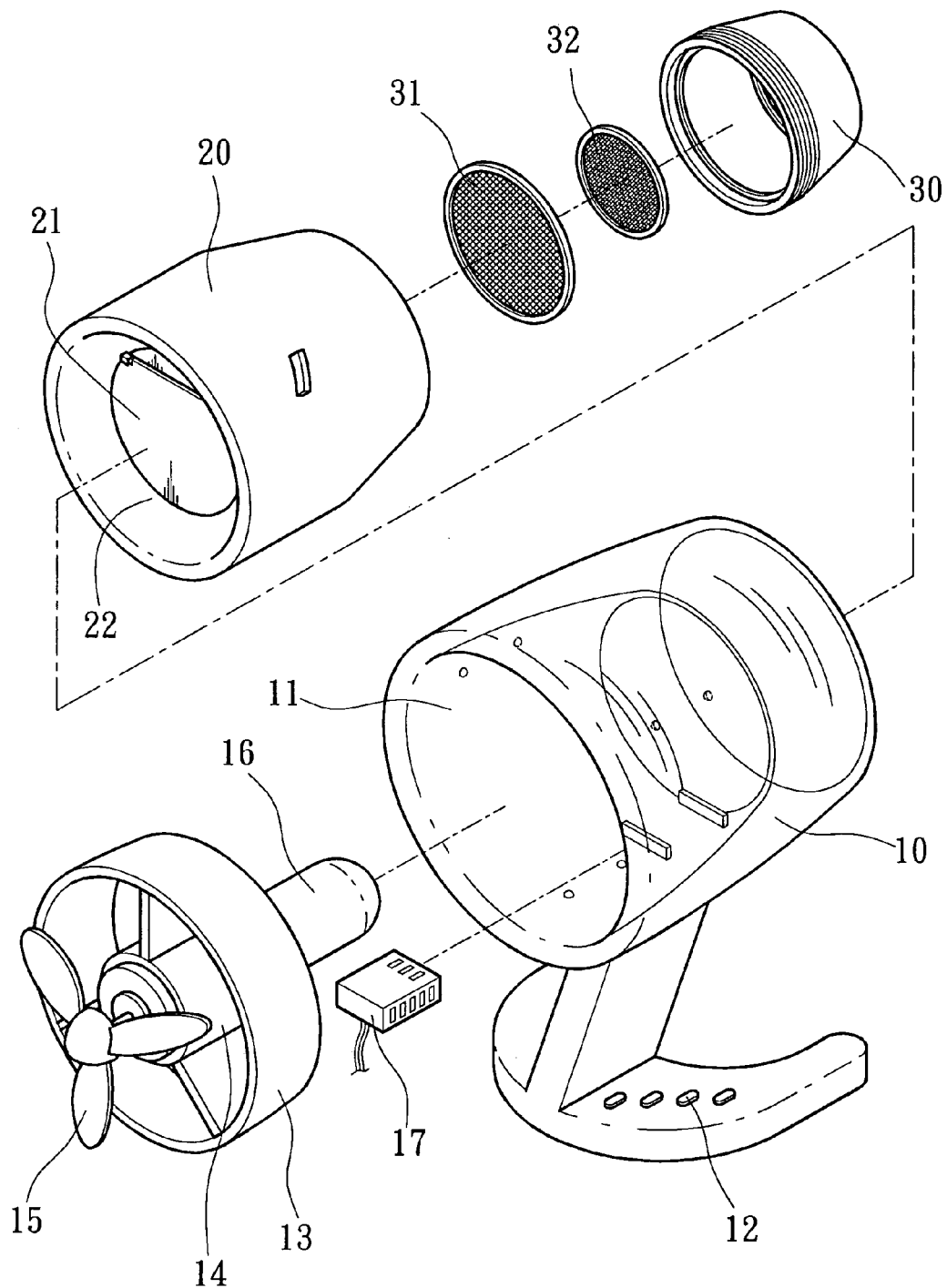
FIG. 1 is an exploded view of a multipurpose mosquito trap lamp according to the present invention.
Figure 2:
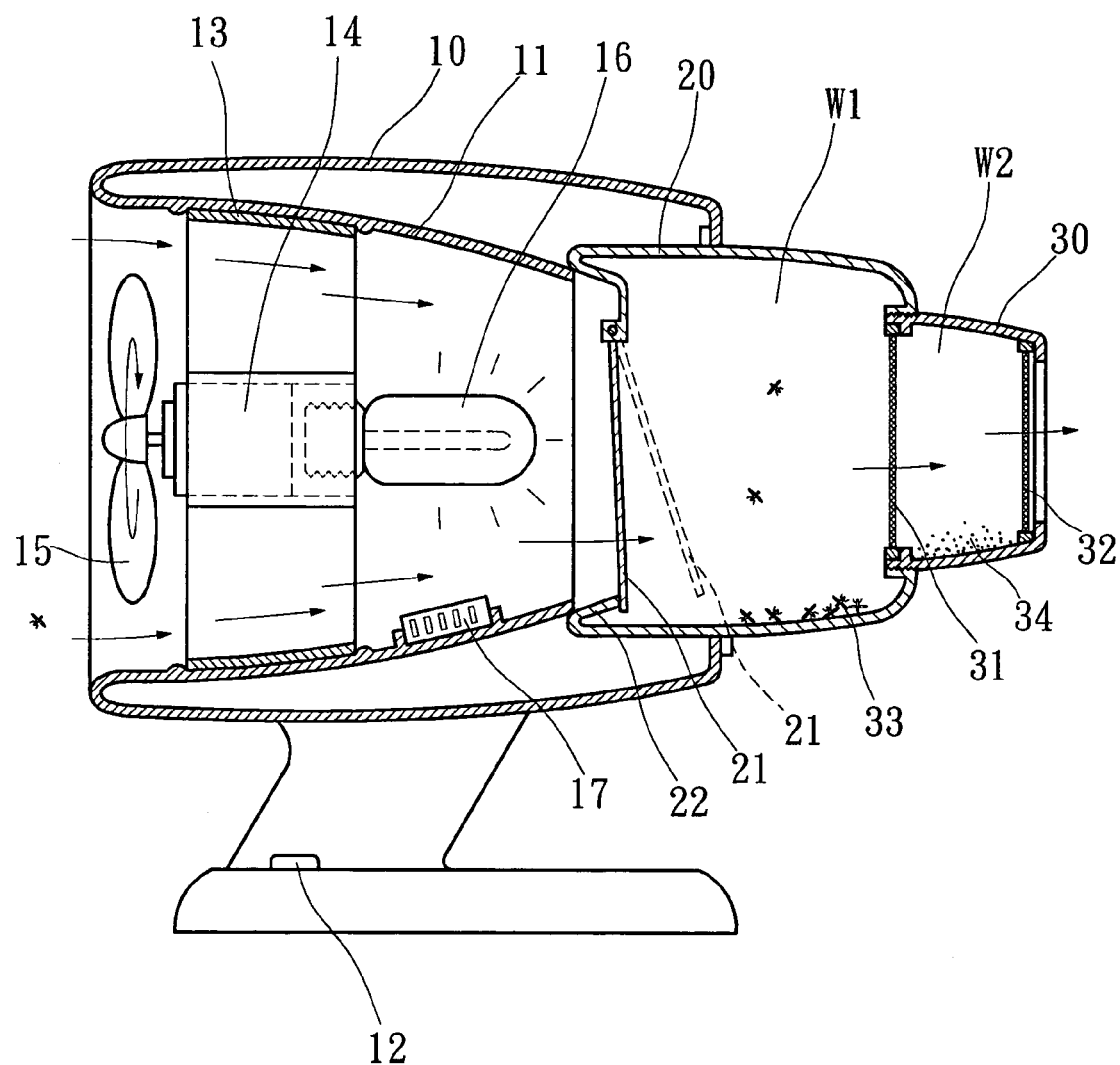
FIG. 2 is a schematic sectional view of the present invention showing the mosquito trap lamp in action (I).

Referring to FIGS. 1 and 2, a multipurpose mosquito trap lamp in accordance with the present invention is shown comprising a base 10, which admits light and comprises a set of function selection buttons 12 and an open chamber 11, a circular holder frame 13, which is mounted inside the open chamber 11 of the base 10 and has a hub 14, an induced-draft fan 15 mounted in the front side of the hub 14 and electrically connected to the set of function selection buttons 12, an ultraviolet lamp 16 mounted in the rear side of the hub 14 and electrically connected to the set of function selection buttons 12, a hollow shell 20, which is coupled to the rear side of the open chamber 11 of the base 10 and which comprises a mosquito-catching chamber W1, an one-way swinging door 21 that closes the mosquito-catching chamber W1, and a stop flange 22 adapted to limit the swinging angle of the swinging door 21 to a predetermined range, a filter cap 30, which is fastened to the rear side of the hollow shell 20 and defines therein a dust chamber W2 and holds a front wire gauze filter 31 and a rear wire gauze filter 32 at front and rear sides of the dust chamber W2 to filter dust from air passing through the filter cap 30, and an ozone generator 17 mounted inside the open chamber 11 of the base 10 and electrically connected to the set of function selection buttons 12. The front wire gauze filter 31 has open spaces relatively greater than the rear wire gauze filter 32.

Referring to FIG. 2 again, when operated the set of function selection buttons 12 to start the mosquito trap lamp, the induced-draft fan 15, the ultraviolet lamp 16 and the ozone generator 17 are turned on. At this time, the induced-draft fan 15 induces currents of air toward the rear side to open the swinging door 21 and to pass through the mosquito-catching chamber W1, the dust chamber W2 and the filter cap 30. At the same time, the ultraviolet lamp 16 give off ultraviolet light to attract mosquitoes 33. When mosquitoes 33 are approaching, they will be immediately sucked into the open chamber 11 of the base 10 and then the mosquito-catching chamber W1 by means of the suction force produced by the induced draft of air. If the mosquito trap lamp is stopped at the time, the one-way swinging door 21 automatically closes the mosquito-catching chamber W1 (due to the effect of the gravity weight. Further, when induced draft of air passing through the front wire gauze filter 31 and the rear wire gauze filter 32, the front wire gauze filter 31 and the rear wire gauze filter 32 remove dust from air, and the ozone generator 17 generates ozone to sterilize the passing flow of air. Therefore, the mosquito trap lamp can also clean the air.

Further, by means of the set of function selection buttons 12, the user can selectively turn on the induced-draft fan 15, or turn on the induced-draft fan 15 and the ozone generator 17 at the same time.

Further, because the hollow shell 20 and the filter cap 30 are detachable, the cleaning of the mosquito trap lamp is easy.

Figure 3:
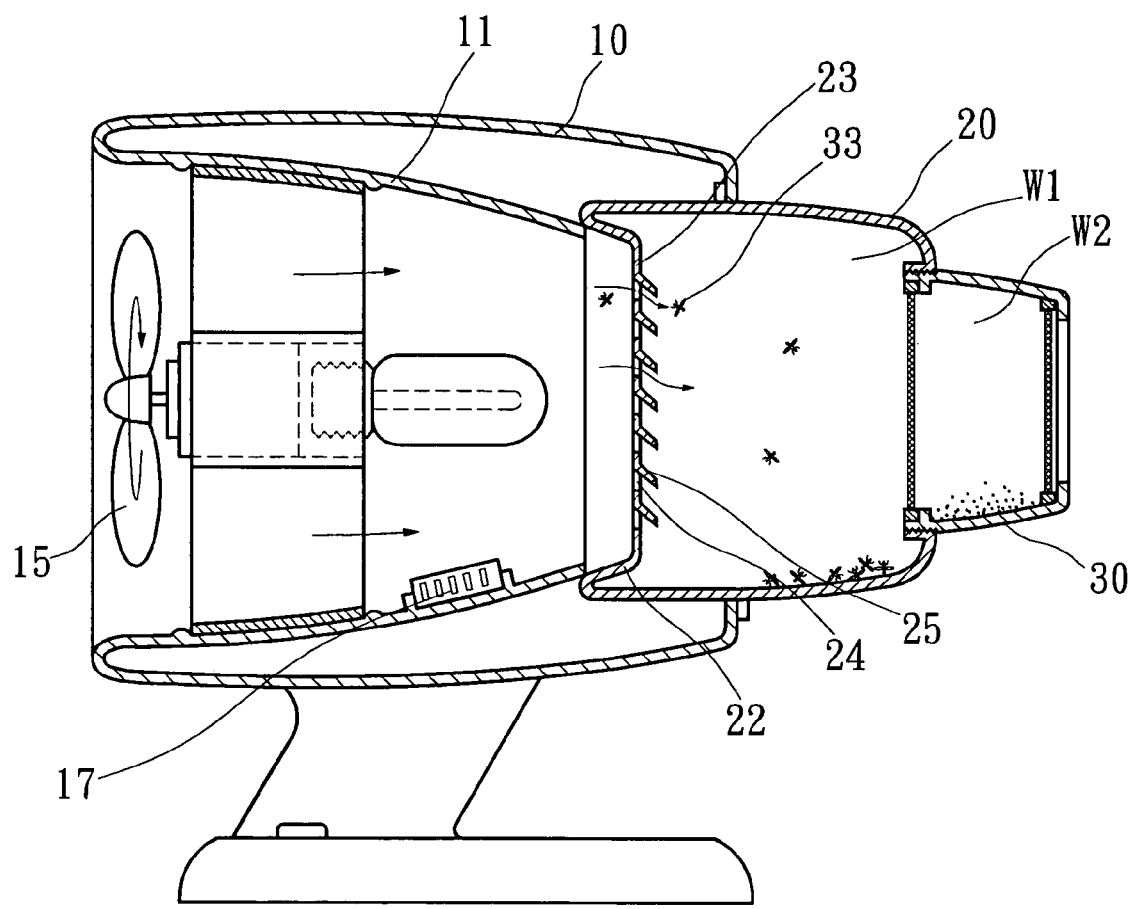
FIG. 3 is a schematic sectional view of an alternate form of the multipurpose mosquito trap lamp according to the present invention.

FIG. 3 shows an alternate form of the present invention. According to this embodiment, the hollow shell 20 has a door panel 23 fastened to the stop flange 22. The door panel 23 has a plurality of slots 24, and a plurality of sloping slats 25 respectively obliquely extended from the top side of each of the slots 24 at the back for guiding mosquitoes into the mosquito-catching chamber W1 and stopping trapped mosquitoes from escaping out of the mosquito-catching chamber W1 through the slots 24.

A prototype of multipurpose mosquito trap lamp has been constructed with the features of FIGS. 1~3. The multipurpose mosquito trap lamp functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A multipurpose mosquito trap lamp comprising:
a base, said base admitting light, said base comprising a set of function selection buttons for operation control and an open chamber;
a circular holder frame mounted inside the open chamber of said base, said circular holder frame having a hub;
an induced-draft fan mounted in a front side of said hub and electrically connected to said set of function selection buttons;
an ultraviolet lamp mounted in a rear side of said hub and electrically connected to said set of function selection buttons;
a hollow shell coupled to a rear side of said open chamber of said base, said hollow shell comprising a mosquito-catching chamber; and
a filter cap fastened to a rear side of said hollow shell opposite to said base, said filter cap comprising a dust chamber, a front wire gauze filter and a rear wire gauze filter respectively fastened to front and rear sides of said dust chamber to filter dust from air passing through.

2. The multipurpose mosquito trap lamp as claimed in claim 1, further comprising an ozone generator mounted inside said open chamber of said base and electrically connected to said set of function selection buttons.

3. The multipurpose mosquito trap lamp as claimed in claim 1, wherein said hollow shell comprises an one-way swinging door that closes said mosquito-catching chamber when said induced-draft fan does no work and is forced to open said mosquito-catching chamber by induced currents of air during operation of said induced-draft fan.

4. The multipurpose mosquito trap lamp as claimed in claim 1, wherein said hollow shell comprises a door panel at a front side in front of said mosquito-catching chamber, said door panel having a plurality of slots for enabling mosquitoes to pass into said mosquito-catching chamber, and a plurality of sloping slats respectively obliquely extended from a back wall thereof adjacent to said slots for guiding mosquitoes into said mosquito-catching chamber and stopping trapped mosquitoes from escaping out of said mosquito-catching chamber through said slots.

* * * * *